United States Patent [19]

Parke

[11] Patent Number: 5,025,394

[45] Date of Patent: Jun. 18, 1991

[54] METHOD AND APPARATUS FOR GENERATING ANIMATED IMAGES

[75] Inventor: Frederic I. Parke, Glen Cove, N.Y.

[73] Assignee: New York Institute of Technology, Old Westbury, N.Y.

[21] Appl. No.: 242,434

[22] Filed: Sep. 9, 1988

[51] Int. Cl.[5] .............................................. G06F 15/66
[52] U.S. Cl. .................................... 364/518; 364/521; 340/724; 340/728; 382/47
[58] Field of Search ................ 364/518, 521; 340/747, 340/750, 728, 724; 382/31, 56, 45, 47

[56] References Cited

U.S. PATENT DOCUMENTS

| | | |
|---|---|---|
| 3,037,083 | 5/1962 | Inouye . |
| 3,715,483 | 2/1973 | Limb et al. . |
| 4,068,258 | 1/1978 | Bied-Charreton et al. ............. 358/4 |
| 4,189,743 | 2/1980 | Schure et al. ........................... 358/93 |
| 4,189,744 | 2/1980 | Stern ...................................... 358/93 |
| 4,517,597 | 5/1985 | Glenn ................................... 358/141 |
| 4,628,344 | 12/1986 | Glenn ................................... 358/12 |
| 4,652,909 | 3/1987 | Glenn ................................... 358/41 |
| 4,667,226 | 5/1987 | Glenn ................................... 358/41 |
| 4,680,720 | 7/1987 | Yoshii et al. ......................... 364/521 |
| 4,701,783 | 10/1987 | Glenn ................................... 358/12 |
| 4,701,863 | 10/1987 | Bruce ................................... 364/518 |
| 4,721,998 | 1/1988 | Glenn ................................... 358/37 |
| 4,725,892 | 2/1988 | Suzuki et al. ....................... 358/287 |
| 4,733,299 | 3/1988 | Glenn ................................... 358/140 |
| 4,742,558 | 3/1988 | Ishibashi et al. ..................... 382/56 |
| 4,768,156 | 8/1988 | Whitehouse et al. ............... 364/521 |
| 4,792,854 | 12/1988 | Glenn ................................... 358/160 |
| 4,816,913 | 3/1989 | Harney et al. ....................... 358/133 |

Primary Examiner—Dale M. Shaw
Assistant Examiner—Phu K. Nguyen
Attorney, Agent, or Firm—Martin Novack

[57] ABSTRACT

A method for generating electronic representations of animated images from stored image data elements with reduced computational requirements. The image data elements may be made available from one or more data base sources, and may be of any suitable form from which images can be computed. A first sequence of relatively low resolution frames are computed from the stored image data elements, this first sequence of frames representing animated images over a given time period. A second sequence of relatively high resolution frames are computed from the stored image data elements, this second sequence of frames representing the animated images over the given time period. The number of frames in the second sequence is less than the number of frames in the first sequence. Corresponding frames of the first and second sequences are combined to obtain output high resolution frames representative of the animated images over the given time period. The following steps are also performed: spatially interpolating each of the frames of the first sequence to increase the number of pixels in the spatially interpolated frames, and temporally interpolating between frames of the second sequence to obtain further frames in said sequence. The combining step includes combining the interpolated first sequence frames with second sequence frames and further second sequence frames.

16 Claims, 5 Drawing Sheets

METHOD AND APPARATUS FOR GENERATING ANIMATED IMAGES

BACKGROUND OF THE INVENTION

This invention relates to the generation of electronic representations of moving images and, more particularly, to an improved method and apparatus for creating animated images from stored image data elements with substantially reduced computational requirements.

The creation of high quality animated images is generally considered to be tedious and expensive. Before the advent of computer-generated animation, each animated film required artists to produce large numbers of drawings, with thousands of drawings being necessary to produce even a short film segment. In recent years, the development of sophisticated computer animation techniques permits artists' time to be more efficiently utilized, with the computer serving to automatically perform a number of tasks, including computation of objects as they are to appear in an image and generation of so-called "in between" frames of an animated sequence. However, computer-generated animation has only recently begun to approach the quality of non-automated manually created animation. However, as computer-generated animation is produced with higher quality and higher resolution, the number of computations necessary for generating images from stored image data elements grows quickly, and this tends to increase the necessary processor and memory capabilities and/or the time necessary for producing the animation. The result is a higher cost of producing computer-generated animation.

It has been previously demonstrated that the characteristics of human vision can be taken into account in the design of equipment for encoding and decoding video signals or storing video signals with reduced bandwidth requirements. For example, an electronic video signal can be encoded at reduced bandwidth by lowering the frame refresh rate of the high spatial frequency components, while maintaining the frame refresh rate of at least a portion of the low spatial frequency components at the standard rate. If done in a specified manner, this will not cause substantial degradation in the ultimately displayed image, since human vision cannot perceive changes in high spatial resolution information at as fast a rate as it can perceive changes in low spatial resolution information. Accordingly, an electronic video encoding and decoding system has been devised which takes advantage of this, and other characteristics of human vision by encoding higher spatial resolution video components to be at a temporal information rate which approximately corresponds to the highest rate actually perceived by the human vision system for such components; thereby eliminating the need to encode these components at a higher rate, which inherently wastes bandwidth. Also, it has been shown that the low spatial resolution information can be generated in a form which is compatible with standard television video, e.g. NTSC video. In this regard, reference can be made, for example, to U.S. Pat. Nos. 4,517,597, 4,628,344, 4,652,909, 4,667,226, and 4,701,783, all assigned to the same assignee as the present application.

The described techniques are very useful in processing video signals to reduce the bandwidth necessary for transmission and/or storage of the signals. It has been suggested that techniques which take advantage of the indicated characteristics of human vision could also be used advantageously in the creation of animated images. However, to Applicant's knowledge, practical techniques and systems for creating animation with substantial saving of computational complexity and/or storage requirements and/or time have not been forthcoming.

It is among the objects of the present invention to provide an improved and practical method and apparatus for creating electronic representations of animated images from stored image data elements with substantially reduced computational requirements.

SUMMARY OF THE INVENTION

In accordance with an embodiment of the invention, there is provided a method for generating electronic representations of animated images from stored image data elements. The image data elements may be made available from one or more data base sources, and may be of any suitable form from which images can be computed. A first sequence of relatively low resolution frames are computed from the stored image data elements, this first sequence of frames representing animated images over a given time period. A second sequence of relatively high resolution frames are computed from the stored image data elements, this second sequence of frames representing the animated images over the given time period. The number of frames in the second sequence is less than the number of frames in the first sequence. Corresponding frames of the first and second sequences (i.e., frames representing components of the same image to be ultimately displayed) are combined to obtain output high resolution frames representative of the animated images over the given time period.

In the preferred embodiment of the method of the invention, there are at least twice as many computed frames of the first sequence as there are computed frames of the second sequence. For example, in an illustrated embodiment, the first sequence may be computed for ultimate presentation at 30 frames per second, and the second sequence computed for ultimate presentation at 15 frames per second. Also, the preferred embodiment of the method of the invention further includes the following steps: spatially interpolating each of the frames of the first sequence to increase the number of pixels in the spatially interpolated frames, and temporally interpolating between frames of the second sequence to obtain further frames in said sequence. In this embodiment, the combining step includes combining the interpolated first sequence frames with second sequence frames and further second sequence frames. Also, in this embodiment, the spatial interpolation of the first sequence of frames produces interpolated frames having the same number of pixels as the frames of the second sequence of frames, and the temporal interpolation of the second sequence of frames produces a total number of second sequence frames and further second sequence frames that is the same as the number of frames in the first sequence.

In a described further form of the method of the invention, there is computed a third sequence of intermediate resolution frames representing the animated images over the given time period, the number of frames in the third sequence being less than the number of frames in the first sequence and greater than the number of frames in the second sequence. In this embodiment, the frames of the third sequence of frames are both spatially interpolated and temporally interpolated to obtain an interpolated third sequence of frames that has the same total number of frames as the frames of the first sequence, and the same number of pixels per frame as the frames of the second sequence.

An important advantage of the invention is that the total number of pixel values which are computed for each output frame is substantially less than the number necessary when employing conventional methods of directly computing the output frame pixel values for each pixel of each frame at the output pixel density and frame rate. This is because of the reduction in the necessary number of computed frames of the relatively higher resolution information. The embodiment which utilizes a sequence of intermediate resolution frames requires even less total computations, for a given output effective resolution, than the embodiment which employs only sequences of relatively high and relatively low resolution frames.

The invention has application to generating output images at any suitable resolution, the advantages in reduced computation being present, for example, for a so-called conventional resolution output as well as for outputs that are at higher than conventional.

Further features and advantages of the invention will become more readily apparent from the following detailed description when taken in conjunction with the accompanying drawings.

DESCRIPTION OF THE PREFERRED EMBODIMENT

Figure 1:
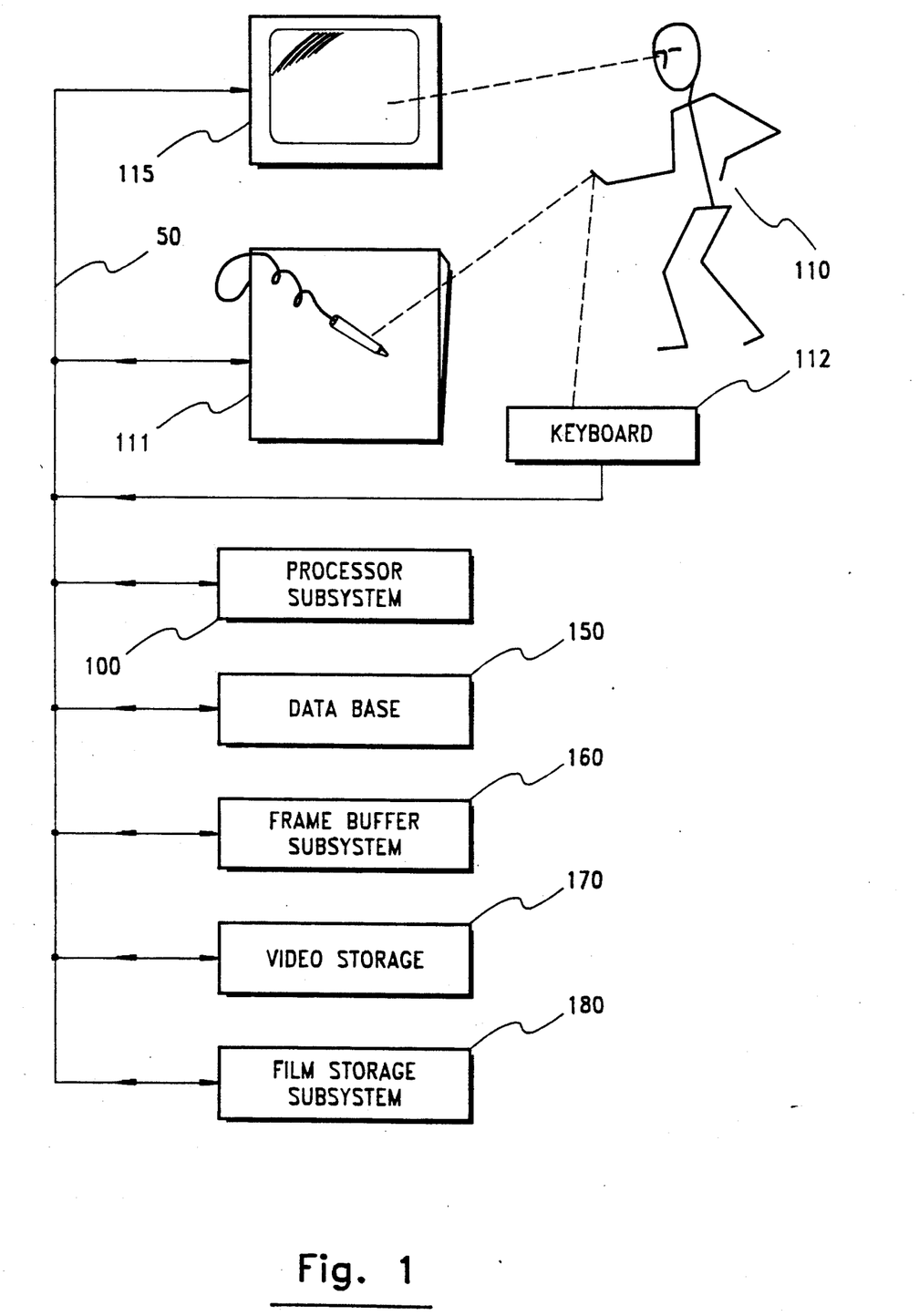
FIG. 1 is a block diagram of a system which, when properly programmed, can be used to practice an embodiment of the invention.

Referring to FIG. 1, there is shown a system which, when properly programmed in accordance with the teachings hereof, can be used to practise an embodiment of the invention. In the illustrated embodiment an operator 110 is shown at a work station that includes input devices such as a data tablet 111 and a keyboard 112, and one or more display devices represented by monitor 115. As will become understood, the technique of the invention could be implemented automatically under program control, such as when a script has been previously formulated to define the nature of the images to be computed by the system. However, in the illustrated system, an animator (i.e., operator 110) can be involved in the image creation process on a dynamic basis, e.g. by selecting the source and control of images or image components to be produced. It is emphasized that the advance of the present invention pertains to economies in the image creation process, and is not limited by the source of data from which images are to be created, or the control (automatic, semi-automatic, or manual) which determines data selection and manipulation employed for obtaining the desired images from the source data, these being well known in the art.

The various devices in the FIG. 1 embodiment are illustrated as being coupled, via a bus 50, to a processor subsystem 100 which may comprise a suitably programmed general purpose processor or computer, such as a Model VAX 11-785, sold by Digital Equipment Corporation, equipped with programmed memory, working memory, timing circuitry, and the like, as is known in the art. Other processor means, such as a special purpose computer or circuitry, may alternatively be employed.

In the illustrated embodiment, the data base 150 represents the source or sources of data from which images are to be created. These data sources may range from simple lines, curves, or polygons to complex objects, sets of objects, backgrounds, etc., without limitation. A frame buffer subsystem 160 is provided, and includes one or more high resolution frame buffers, which are well known in the art. A frame buffer typically comprises an addressable memory which stores a frame of video information. The video can be in any desired format, and need not be in a standard television format. Each elemental region (also referred to as a point or "pixel") in the video frame has a stored value or values (referred to as the "video content value" or "pixel value") associated with it. The stored value is typically an n-bit word that represents video content, e.g. by bits which represent luminance and chrominance or which represent color component values for R, B and G. Available frame buffers also include means for scanning the contents of their video memory and converting the result to frames of analog video suitable for storage and/or display, and the frame buffer(s) hereof are assumed to have this capability. A video storage device 170 is provided, and may comprise any suitable known type of analog or digital video recording means for storing high resolution video, such as a video tape recorder or disc. A suitable film storage subsystem 180, with capability for converting high resolution video frames to images on film, may also be provided, as is known in the art.

Figure 2:
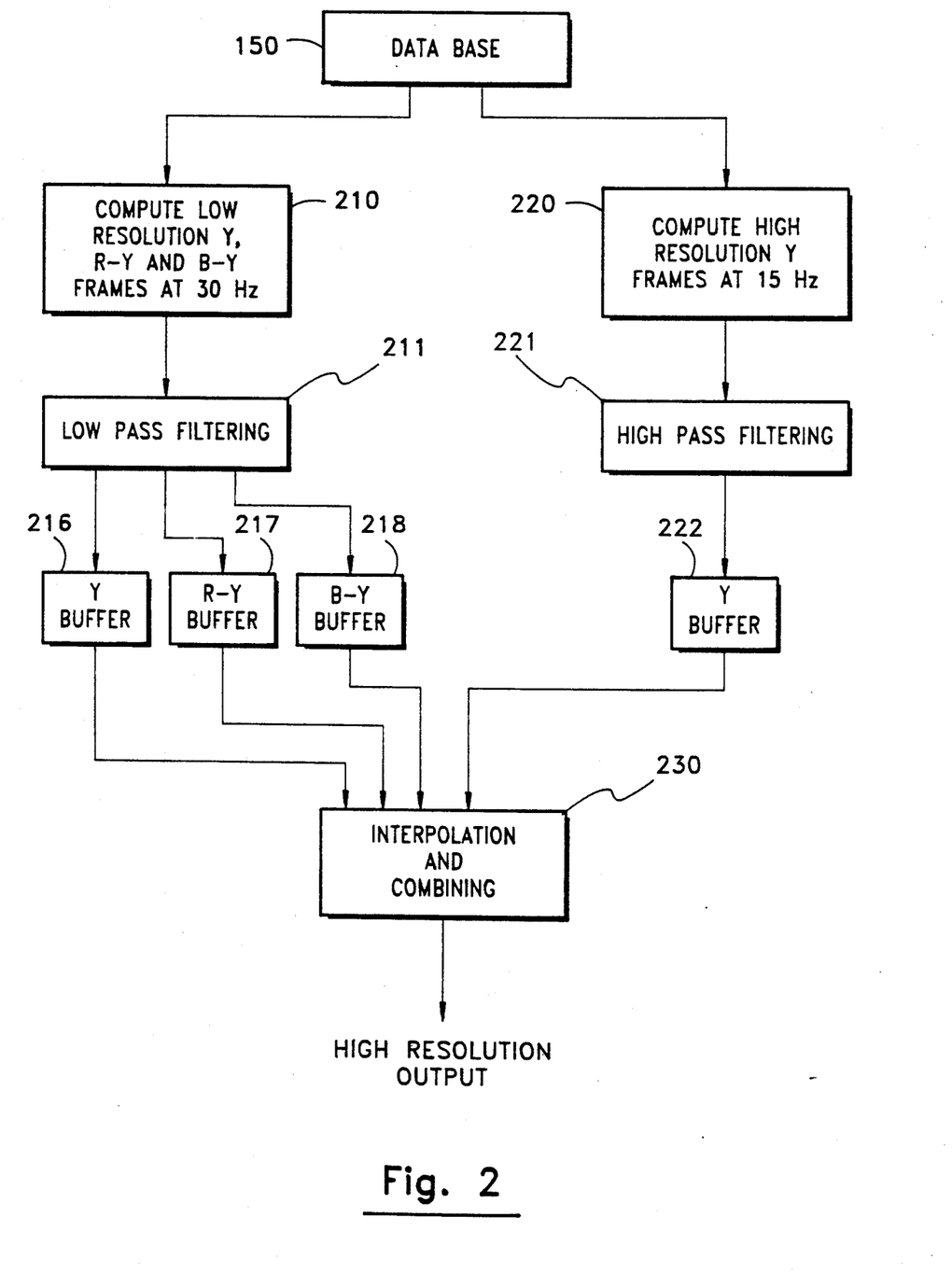
FIG. 2 is a simplified procedural diagram which illustrates operation of an embodiment of the invention.

Referring to FIG. 2, there is shown a simplified diagram which illustrates the technique of an embodiment of the invention. The data base 150 is the data base of FIG. 1, and contains the graphic descriptions from which images can be created. The block 210 represents the computing, from the stored data, and in accordance with control of an operator (e.g. 110 in FIG. 1) and/or control of a program, of frames of relatively low resolution luminance (Y) and color difference (R-Y and B-Y) information. [As described, for example, in the abovereferenced U.S. Pat. No. 4,628,344, pertaining to encoding and decoding of video, chrominance components can be presented at a relatively lower frame refresh rate than high resolution luminance components. For a monochrome system, only the low and high resolution luminance will be computed.] The computed information is low-pass filtered (block 211) to remove high spatial frequency components, and then stored (buffers 216, 217 and 218).

Relatively high resolution frames of luminance information are also computed and stored, as represented by the block 220. These frames have a higher pixel density than the lower luminance frames computed in accordance with block 210. For example, the higher resolution frames may have twice as many computed pixels in both the horizontal and vertical directions as the lower resolution frames; i.e. four times the pixel density. Also, there are less high resolution frames than low resolution frames computed and stored for a given time period of animation to be presented. For example, 30 frames of low resolution information and 15 frames (or, say, 7.5 frames) of the high resolution information may be produced for each second of animation to be presented. The high resolution frames are high-pass filtered (block 221) to remove low spatial frequency components, and then stored (buffer 222). The low and high pass filtering (blocks 211 and 221) can be implemented using hardware or software techniques, a suitable known software technique being utilized in the present embodiment to implement this filtering, as noted below in conjunction with FIG. 3. The stored filtered frame components are interpolated and combined (block 230), in a manner to be described hereinbelow in conjunction with FIG. 4, to obtain the output high resolution frames. The output frames may be in the form of high resolution luminance and color difference signals, or may be converted to high resolution color component signals, R, B, and G, as is well known in the art.

Figure 3:
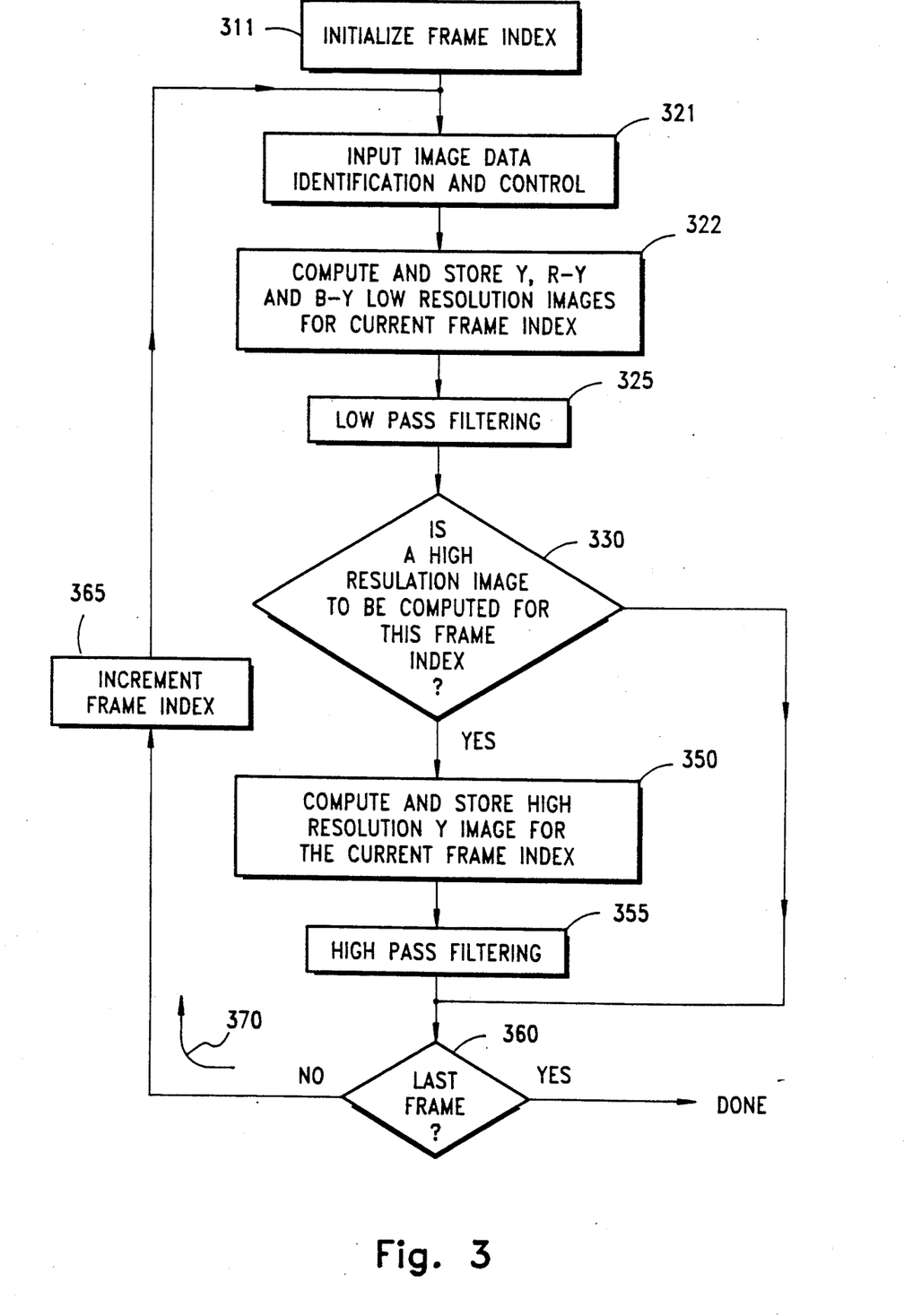
FIG. 3 is a flow diagram of a routine for programming a processor to implement an embodiment of the invention.

Referring to FIG. 3, there is shown a flow diagram of a routine for programming a processor, such as the processor subsystem 100 in FIG. 1, to implement a technique in accordance with the FIG. 2 embodiment. In the present illustration, it is assumed that all the data from which images are to be generated is present in the data base 150, but it will be understood that any suitable source or sources of data can be utilized, as can any suitable means for determining the nature of the images to be computed or for performing the image computations. As noted above, these aspects are well developed in the prior art, and are not, of themselves, inventive features hereof.

The block 311 represents the initializing of a frame index which, in the present embodiment, can be envisioned as representing a frame count in the ultimate presentation of the animated images to be generated using the invention. It will be understood that the image generation hereof is typically not implemented in real time, and this index is for the purpose of keeping track of the generated image components being processed for ultimate composition and presentation. Accordingly, a time reference index (pertaining to time during the ultimate presentation) or other suitable index, could alternatively be utilized.

The block 321 represents the inputting of the image data identification and control which determines the selection of data base information and the computing function or the like for the current frame index. As previously noted, this function is well known in the art, and will typically be implemented by a program, such as a so-called exposure sheet program, and/or under operator control. The block 322 represents the computing and storing of the relatively low resolution frames of Y, R-Y, and B-Y image components for the current frame index. As above noted, these computations are common in the art, and the types of computations used are not, per se, an inventive feature hereof. The image components should be computed so that no substantial frequency components occur which would result in spatial frequency aliasing. This means that the computed image components should contain only spatial frequencies at or below the maximum spatial frequency possible for an image of that resolution. If higher spatial frequencies are present, artifacts such as edge stairstepping and small object scintillation may result. In the illustrated embodiments, this problem is reduced by employing suitable filtering of the computed image components. The block 325 represents the low pass filtering of the computed image components, and this filtering and the other filtering hereof can be implemented using known software routines, for example, one which implements a discrete two-dimensional convolution using a four pixel by four pixel symmetric Gaussian kernal. The filtering may also be performed using known hardware, or performed directly in conjunction with the image computation process.

Inquiry is next made (diamond 330) as to whether a relatively high resolution luminance frame (e.g. as illustrated with regard to block 220 in FIG. 2) is to be computed for the present frame index. In the present embodiment, the relatively low resolution image components are generated for an ultimate presentation rate of 30 frames per second, and the relatively high resolution luminance frames are generated for a presentation rate of 15 frames per second, although other suitable rates, less than 30 frames per second, can be utilized. This means that in the present embodiment, a high resolution luminance frame will be computed half as often as a low resolution luminance frame and, for example, the high resolution frames can be computed only at odd frame index numbers. If the answer to the inquiry of diamond 330 is negative, diamond 360 is entered directly. Otherwise, the blocks 350 and 355 are entered for computation and storage of the relatively high resolution luminance image component, and high pass filtering of the images. In the present embodiment, the high resolution images may be computed, for example, to have twice as many pixels as the low resolution luminance frames in both the vertical and horizontal directions; i.e. four times as many total pixels as the low resolution frames. Inquiry is then made (diamond 360) as to whether the last frame of the current sequence of frames being generated has been computed. If not, the frame index is incremented (block 365), and the loop 370 is continued until all frames of the sequence have been computed.

Figure 4:
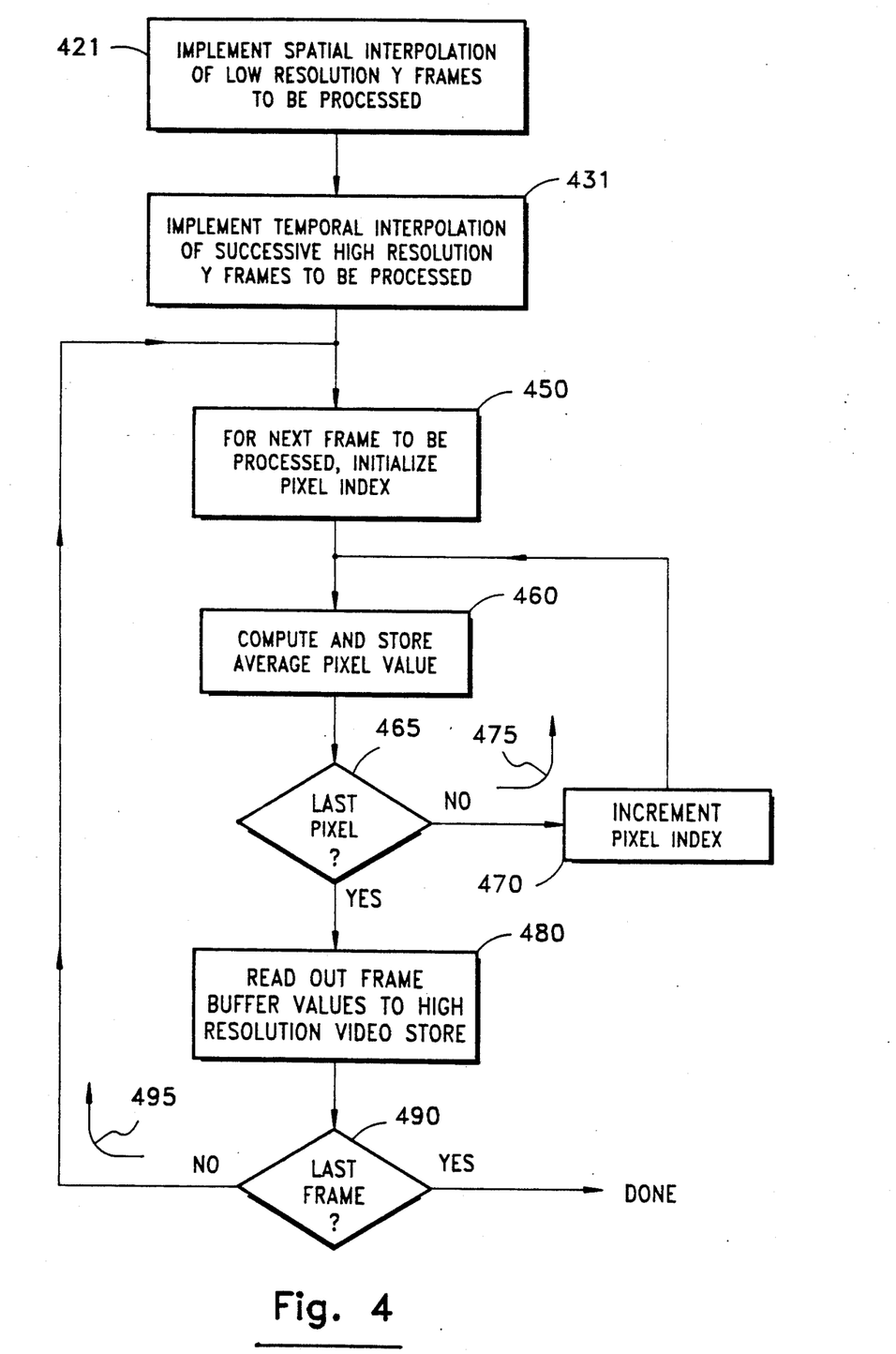
FIG. 4 is a flow diagram of an embodiment of a routine for interpolating from stored frames to obtain frames that are combined to obtain the desired high resolution frames.

Referring to FIG. 4, there is shown a flow diagram of an embodiment of the routine for interpolating from the stored frames to obtain frames that are combined to obtain the desired high resolution frames. These operations were first represented by the block 230 in FIG. 2. In the present embodiment, low resolution frames are spatially interpolated to obtain frames having the same number of pixels as the high resolution frames. Also, the high resolution frames (which, it will be recalled, are produced less frequently than the low resolution frames) are temporally interpolated to obtain the same number of frames as the low resolution frames. After these interpolations, the resultant frame sequences and can be readily combined to obtain high resolution output frames. The concepts of spatial interpolation and temporal interpolation, per se, and the type of means for performing these interpolations, are known in the art and are described, for example, in the abovereferenced U.S. Pat. Nos. 4,517,597 and 4,628,344. For example, the interpolations can be performed using hardware (or software) that operates, in the case of the spatial interpolation, to average (or other suitable mathematical combining function) adjacent pixel values and, in the case of the temporal interpolation, to average (or other suitable mathematical combining function) corresponding pixels of successive frames to obtain the interpolated frames. In FIG. 4 the spatial interpolation is represented by the block 421, and the temporal interpolation is represented by the block 431. After these interpolations are performed, for the first pair of luminance frames to be combined, a pixel index is initialized, as represented by the block 450. For the pixel being considered, the pixel values are averaged (or, for example, can be combined in other suitable ways, such as adding, with this being taken into account in interpreting the combined pixel values when they are later converted into analog form for ultimate display), and this average value is stored, e.g. in the frame buffer subsystem of FIG. 1, as represented by the block 460. The resultant value, stored in the frame buffer subsystem, will be the high resolution luminance value for the particular pixel of an output frame. Inquiry is then made (diamond 465) as to whether the last pixel has been processed. If not, the pixel index is incremented (block 470), and the loop 475 is continued until all output pixel values for the current frame have been computed and stored. When the answer to the inquiry of diamond 465 is in the affirmative, however, a complete output frame has been stored in the frame buffer and the block 480 represents the reading out of this frame for storage in a high resolution video store, e.g. the block 170 of FIG. 1, and/or the storage means of film recording subsystem 180 of FIG. 1. Inquiry is then made (diamond 490) as to whether the last frame of a sequence being computed has been processed. If not, the block 450 is reentered and the loop 495 is continued until all frames of a desired sequence have been processed and output.

In the example set forth, the interpolation and combining is provided for the high and low resolution luminance, and the stored low resolution color component information can be used in analog processing to obtain the output color video. Alternatively, spatially interpolated frames of R-Y and B-Y can be generated and used in producing the output video and/or film. Also, in the examples set forth above and below, the processing, such as for computing frames, performing interpolations, and combining frames, is described as being sequential, and it will be understood that portions thereof can alternatively be performed in different orders or in parallel using multiple processors, parallel hardware, or other suitable means. Also, the processing described utilizes luminance and color difference components, but processing in terms of R, B and G relatively low resolution components, and a relatively high resolution luminance (Y) component can alternatively be utilized.

Figure 5:
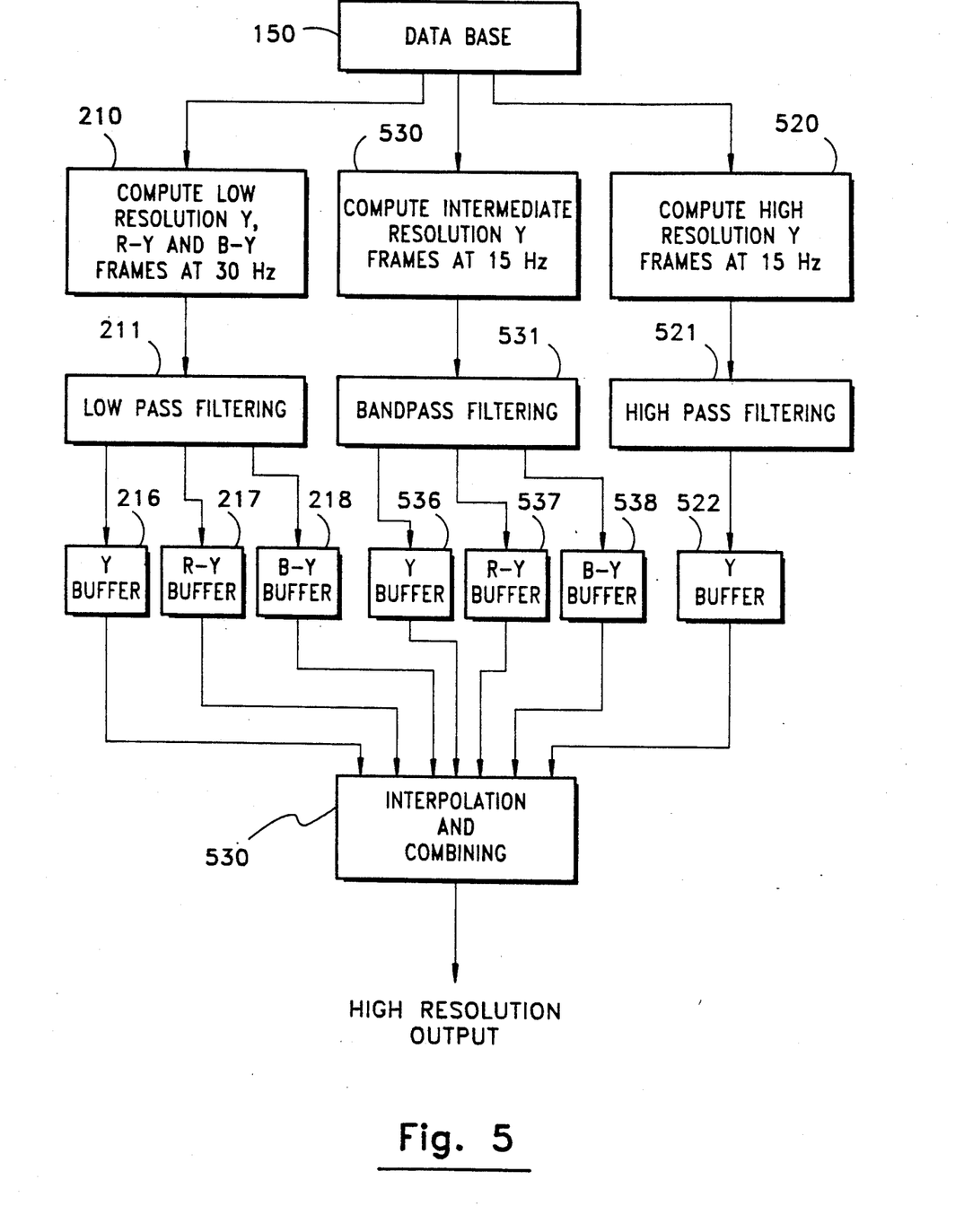
FIG. 5 illustrates operation in accordance with a further embodiment of the invention.

Referring to FIG. 5, there is shown a diagram which illustrates a technique in accordance with a further form of the invention. In this embodiment, the data base 150, and the blocks 210, 211, 216, 217 and 218, pertaining to the computation, filtering, and storage of the relatively low resolution frames, are the same as in FIG. 2. The blocks 520, 521 and 522 are similar to corresponding blocks 220, 221 and 222 of FIG. 2, except that in the present embodiment 7.5 relatively high resolution frames are produced for each second of animation to be presented. Also, in this embodiment the high resolution frames have four times as many pixels in both the horizontal and vertical directions as the relatively low resolution frames. Also, in the present embodiment, intermediate resolution frames of luminance and color difference information are computed (block 530), there being 15 intermediate resolution frames for each second of animation to be presented. These frames have twice as many pixels in both the horizontal and vertical directions as the relatively low resolution frames (and, accordingly, half as many pixels in both the horizontal and vertical directions as the relatively high resolution frames). The block 531 represents the bandpass filtering of the computed intermediate resolution frames and the blocks 536, 537 and 538 respectively represent the storage of the filtered luminance and color difference information. The block 530 is similar to the corresponding block 230 of FIG. 2, except that in this case the frames of intermediate resolution are also interpolated and combined with the sequences of interpolated low and high resolution frames. More specifically, the intermediate resolution frames of the FIG. 5 embodiment are both spatially and temporally interpolated to obtain a sequence of frames having the same number of pixels as the high resolution frames and the same total number of frames, per unit time of animation to be presented, as the low resolution frames. As before, the low resolution frames are spatially interpolated and the high resolution frames are temporally interpolated. This results in the three sequences of frames having the same number of pixels as the high resolution frames and the same number of frames, per unit time of animation to be presented, as the low resolution frames. These three sequences can then be combined, in the manner previously described, by averaging or other suitable means. In terms of the flow diagram of FIG. 4, the interpolation routines for the present embodiment would also include the spatial and temporal interpolation (performed in either order) of the intermediate resolution frames, and the combining of the pixel values of these interpolated frames with the pixel values of the interpolated sequences of high and low resolution frames.

The invention has been described with reference to particular preferred embodiments, but variations within the spirit and scope of the invention will occur to those skilled in the art. For example it will be understood that the numbers of pixels and frames set forth in specific embodiments are for illustration, and other numbers can be used. Also, as previously noted, the order in which operations are performed can be different than is shown in the illustrated embodiment. As an example, the relatively low resolution frames for an entire sequence of animated images may have been previously computed, and the relatively high resolution frames can be computed and combined afterwards.

I claim:

1. A method for generating electronic representations of animated images from stored image data elements, comprising the steps of:

computing, from said stored image data elements, a first sequence of relatively low resolution frames representing animated images over a given time period and low pass filtering the information in said relatively low resolution frames;

computing, from said stored image data elements, a second sequence of relatively high resolution frames representing said animated images over the given time period and high pass filtering the information in said relatively high resolution frames, the number of frames in said second sequence being less than the number of frames in said first sequence; and combining corresponding frames of said first and second sequences to obtain output high resolution frames representative of said animated images over said given time period.

2. The method as defined by claim 1, wherein there are at least twice as many computed frames of said first sequence as there are computed frames of said second sequence.

3. A method for generating electronic representations of animated images from stored image data elements, comprising the steps of:
 computing, from said stored image data elements, a first sequence of relatively low resolution frames of pixels having pixel values and representing animated images over a given time period;
 computing, from said stored image data elements, a second sequence of relatively high resolution frames of pixels having pixel values and representing said animated images over the given time period, the number of frames in said second sequence being less than the number of frames in said first sequence; and
 combining corresponding frames of said first and second sequences by combining corresponding pixels thereof to obtain output high resolution frames representative of said animated images over said given time period.

4. The method as defined by claim 3, wherein there are at least twice as many computed frames of said first sequence as there are computed frames of said second sequence.

5. The method as defined by claim 3, further comprising the steps of:
 spatially interpolating each of the frames of the first sequence to increase the number of pixels in the spatially interpolated frames;
 temporarily interpolating between frames of said second sequence to obtain further frames in said sequence;
 and wherein said combining step includes combining said interpolated first sequence frames with second sequence frames and further second sequence frames.

6. The method as defined by claim 5, wherein said spatial interpolation of said first sequence of frames produces interpolated frames having the same number of pixels as the frames of said second sequence of frames; and wherein said temporal interpolation of said second sequence of frames produces a total number of second sequence frames and further second sequence frames that is the same as the number of frames in said first sequence.

7. A method for generating electronic representations of animated images from stored image data elements, comprising the steps of:
 computing, from said stored image data elements, a first sequence of relatively low resolution frames representing animated images over a given time period;
 computing, from said stored image data elements, a second sequence of relatively high resolution frames representing said animated images over the given time period, the number of frames in said second sequence being less than the number of frames in said first sequence; and
 combining corresponding frames of said first and second sequences to obtain output high resolution frames representative of said animated images over said given time period; at least part of said combining step being performed while said steps of computing said first and second sequences are still being performed.

8. The method as defined by claim 7, wherein there are at least twice as many computed frames of said first sequence as there are computed frames of said second sequence.

9. The method as defined by claim 7, further comprising the steps of:
 spatially interpolating each of the frames of the first sequence to increase the number of pixels in the spatially interpolated frames;
 temporarily interpolating between frames of said second sequence to obtain further frames in said sequence;
 and wherein said combining step includes combining said interpolated first sequence frames with second sequence frames and further second sequence frames.

10. A method for generating electronic representations of animated images from stored image data elements, comprising the steps of:
 computing, from said stored image data elements, a first sequence of relatively low resolution frames representing animated images over a given time period;
 computing, from said stored image data elements, a second sequence of relatively high resolution frames representing said animated images over the given time period, the number of frames in said second sequence being less than the number of frames in said first sequence; and
 computing, from said stored image data elements, a third sequence of intermediate resolution frames representing animated images over the given time period, the number of frames in said third sequence being less than the number of frames in the first sequence and greater than the number of frames in the second sequence; and
 combining corresponding frames of said first, second and third sequences to obtain output high resolution frames representative of said animated images over said given time period.

11. The method as defined by claim 10, wherein said computing of a first sequence of relatively low resolution frames includes low pass filtering the information in said relatively low resolution frames, said computing of a second sequence of relatively high resolution frames includes high-pass filtering the information in said relatively high resolution frames, and the computing of a third sequence of intermediate resolution frames includes bandpass filtering the information in said intermediate resolution frames.

12. The method as defined by claim 10, further comprising the steps of:
 spatially interpolating each of the frames of the first sequence to increase the number of pixels in the spatially interpolated frames;
 spatially interpolating each of the frames of the third sequence to increase the number of pixels in the spatially interpolated third sequence frames and temporally interpolating between spatially interpolated third sequence frames to obtain further third sequence frames;
 temporally interpolating between frames of said second sequence to obtain further frames in said second sequence;
 and wherein said combining step includes combining frames and interpolated frames of said first, second and third sequences.

13. The method as defined by claim 12, wherein said spatial and temporal interpolations result in all sequences of frames having the same number of frames and the same number of pixels per frame.

14. The method as defined by claim 12, wherein said combining step comprises combining the values of corresponding pixels of corresponding frames of said first, second, and third sequences of frames after said spatial and temporal interpolations have been performed.

15. The method as defined by claim 13, wherein said combining step comprises combining the values of corresponding pixels of corresponding frames of said first, second, and third sequences of frames after said spatial and temporal interpolations have been performed.

16. Apparatus for generating electronic representations of animated images from stored image data elements, comprising:
   means for computing, from said stored image data elements, a first sequence of relatively low resolution frames representing animated images over a given time period;
   means for computing, from said stored image data elements, a second sequence of relatively high resolution frames representing said animated images over the given time period, the number of frames in said second sequence being less than the number of frames in said first sequence;
   means for spatially interpolating each of the frames of the first sequence to increase the number of pixels in the spatially interpolated frames to the same number of pixels as the frames of the second sequence of frames;
   means for temporally interpolating between frames of said second sequence to obtain further frames in said sequence, the total number of second sequence frames and further second sequence frames being the same as the number of frames in said first sequence; and
   means for combining corresponding frames of said first and second sequences to obtain output high resolution frames representative of said animated images over said given time period, said combining means including means for combining said interpolated first sequence frames with second sequence frames and further second sequence frames.

* * * * *